United States Patent

Brown

[11] 4,088,245
[45] May 9, 1978

[54] PESTICIDE DISPENSER WITH CALIBRATED TUBULAR OUTLET PROBE

[76] Inventor: Leonard Brown, P.O. Box 817, San Juan Capistrano, Calif. 92675

[21] Appl. No.: 789,425

[22] Filed: Apr. 21, 1977

[51] Int. Cl.² .......................... B67D 5/08; B67D 5/44
[52] U.S. Cl. ..................................... 222/41; 134/103; 222/148; 222/382
[58] Field of Search ................ 222/148, 43, 44, 400.7, 222/382, 41; 141/90, 91, 92; 134/103, 168 R; 137/212, 205, 588

[56] References Cited

U.S. PATENT DOCUMENTS

| | | | |
|---|---|---|---|
| 2,827,070 | 3/1958 | Gratz | 134/103 X |
| 3,141,690 | 7/1964 | Greenfield | 137/212 X |
| 3,348,734 | 10/1967 | Rice et al. | 222/148 X |
| 3,913,606 | 10/1975 | Anderson, Jr. | 137/205 |
| 3,916,924 | 11/1975 | McGowan | 134/168 R |

*Primary Examiner*—Robert B. Reeves
*Assistant Examiner*—David A. Scherbel
*Attorney, Agent, or Firm*—Fulwider, Patton, Rieber, Lee & Utecht

[57] ABSTRACT

A system is described which is useful in dispensing and transferring a predetermined amount of a liquid such as a pesticide from a first container, typically a shipping container to a mixing zone. The control of the total amount of liquid dispensed is achieved by a tubular probe which is slidably mounted in a plug that can be sealed in an aperture of the top or bottom wall of the container. Preferably the probe bears indicia calibrated to indicate amounts of liquid proportional to the depth to which the probe is slid into the container. The device is employed in an system for transferring and metering a toxic liquid such as pesticide in a closed container system wherein the liquid is dispensed and metered from the shipping container and the container is thereafter rinsed free of any pesticide residue in a totally closed system free of any operator intervention.

5 Claims, 3 Drawing Figures

PESTICIDE DISPENSER WITH CALIBRATED TUBULAR OUTLET PROBE

BACKGROUND OF THE INVENTION

This invention relates to a system for dispensing a liquid and, in particular, for dispensing controlled total amounts of a liquid from its container, preferably at a controlled rate of flow. In its most preferred embodiment the invention relates to a system for transferring controlled amounts of a pesticide or other hazardous liquid from its shipping container to a dilution site or applicator tanks while in a totally closed system, thereby minimizing exposure to workers and contamination of the environment.

BRIEF STATEMENT OF THE PRIOR ART

Pesticides are extremely hazardous chemicals which must be handled with a great deal of caution because of their acute mammalian toxicity and profound affect on the environment. Recent government regulations have prescribed that liquid pesticides be dispensed from their shipping container in closed mixing systems. Briefly, the regulations require that the mixing and dispensing system be closed to minimize pesticide exposure to personnel during transfer and rinsing operations.

A number of complex metering and dispensing systems have been devised to meet the closed requirement. All of these systems, however, are relative complex and costly. One system employs a hydraulic ram which pierces the shipping container to permit the material to drain into a mixing tank. The ram tip has orifices from which rinse water is sprayed against the interior walls of the container. Another type employs a Venturi pump to remove the toxic liquid from the shipping container and transfer it under dilution to a holding tank for dilution prior to dispensing. While the aforementioned devices comply with the government reguations and avoid unnecessary exposure to personnel, they are relatively expensive and complex and for this reasons their use is expected to be limited.

Accordingly, a need exists to provide a reliable closed system for dispensing metered amounts of liquids such as toxic pesticides from bulky containers such as the shipping drums of from five to about 60 gallons capacity. The system should be relatively inexpensive and sufficiently rugged for field use and employ a minimum of parts with a simple operating procedure and freedom from maintenance.

BRIEF DESCRIPTION OF THE INVENTION

This invention satisfies the aforedescribed needs and obviates the shortcomings of prior dispensing systems. The invention comprises a closed liquid transfer system including a tubular member assembly which is mounted in an aperture in the top or bottom wall of a liquid container. The assembly includes aperture closure means, mounting means to secure the closure means in sealed relationship to the aperture of a container with an elongated tubular probe having a length at least equal to the height of the container and slidably received by the closure means. The tubular probe bears indicia calibrated in volumetric parts of liquid within the container such that adjustment of the vertical position of the tubular probe in the container to any calibrated mark of the indicia will permit withdrawal of the amount of liquid represented by such calibrated mark. Vent means are provided in the closure means in reversible communication with check valve means and, preferably, pressure relief means are provided to eliminate the possibility of over pressuring the container during rinsing or backflow operation. The system further includes liquid transfer means to transfer the liquid contents from the container and to introduce a rinsing liquid into the container to remove residual liquid prior to disposal of the empty shipping container.

BRIEF DESCRIPTION OF THE DRAWINGS

The preferred embodiment of the invention is shown in the drawings of which:

Referring now to FIG. 1, the closed liquid transfer system of the invention is shown to include an assembly 10 adapted to fit into an aperture in a wall, such as the top wall 12 of a shipping container 14 of a liquid such as a pesticide and the like. Typically, container 14 is a drum of from 5 to about 60, commonly from 5 to about 30 gallons capacity. The top wall 12 of the drum can contain an aperture, bunghole and the like, having a closure member which is removed for the attachment of the assembly 10.

Figure 1:
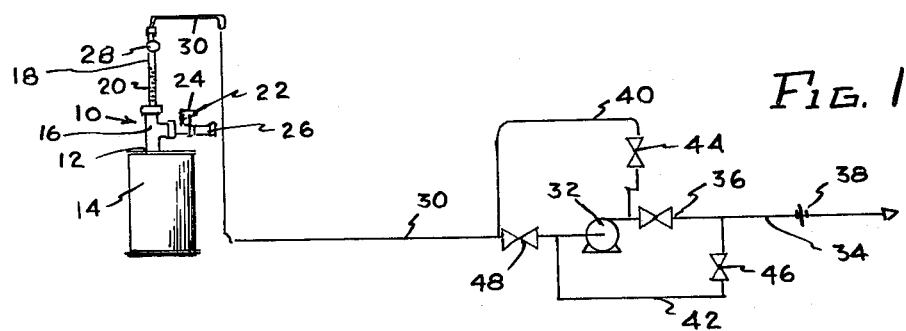
FIG. 1 is a schematic of the system of the invention.

The assembly 10 includes an aperture closure member 16 which slidably receives a tubular probe member 18 that is calibrated in indicia 20. The closure member also has an outlet communicating with pressure relief means 22 in the form of a suitable pressure relief valve having a relief discharge port 24 and a check valve 26 which, preferably, is reversibly attached to the assembly to permit its reversal and reversible venting of the interior of the container 14.

The tubular probe 20 preferably has valve means 28 which can be a simple on-off valve or can be a flow regulating valve, as desired. The discharge end of probe 18 is removably attached to conduit 30 which can be a flexible hose, metal tubing, and the like. Conduit 30 extends to transfer means in the form of a pump 32 which can be a centrifugal pump or a positive displacement pump such as a gear pump, piston pump and the like. The pump discharges to conduit 34 which can be provided with a flow control valve 36 and, if desired, a flow indicating means such as an orifice plate meter 38 to register the amount of flow and provide a sensing element for a control system to regulate the rate of flow through flow control valve 36.

The transfer pump 32 is preferably provided with manifolding means to permit reversing of the flow through conduit 30. This can be achieved by pump by-pass conduits 40 and 42 which are provided with valves 44 and 46, respectively. The conduit 30 is also provided with valve 48 immediately upstream of bypass line 42. By this simple arrangement, the flow through conduit 30 can be reversed, e.g., by closing valves 48 and 36 and opening valves 44 and 46 whereby liquid will be transferred from conduit 34 through pump 32 and conduit 30 into the container 14. This operation is useful when container 14 has been emptied of its toxic liquid contents and is to be rinsed prior to disposal.

Figure 2:
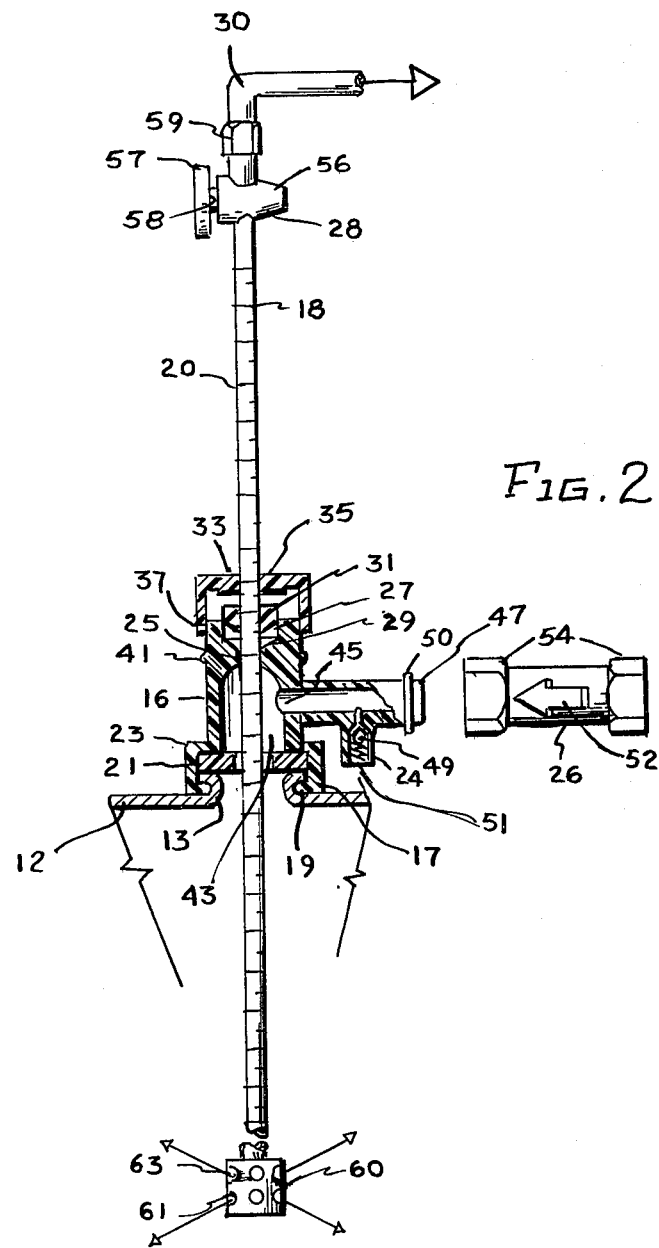
FIG. 2 illustrates a preferred embodiment useful in the system of FIG. 1.

Referring now to FIG. 2, the dispensing and metering assembly 10 will be described in greater detail. As there illustrated, the end wall 12 of container 14 has an apertured gland 13 which receives a container closure member. The container closure member is removed and the dispensing assembly 10 is mounted on the apertured gland 13 in its place. This assembly includes the aperture closure means 16 which comprises a tubular member having mounting means 17 in the form of a tubular neck which fits about gland 13 with detenting tabs 19 which engage into the annular groove of gland 13. The assembly also includes a sealing gasket 21 which is compressed against the upper face of gland 13 and the offset shoulder 23 of the attachment means 17 whereby the closure means is sealably secured to container 14.

As previously mentioned, the aperture closure means 16 slidably receives a tubular probe 18. The tubular probe 18 is received in a through bore 25 of the closure means 16. The upper end of the closure means 16 has a counterbore 27 with a tapered bottom wall that serves as a seat to engage a sealing plug 31 which has a central bore and which is coaxially received over tubular probe 18. The closure member 16 also has a removable cap 33 having a raised face 35 on its undersurface to bear against sealing plug 31 and resiliently secure this plug 31 against seat 29. The cap 33 is provided with attachment means such as an axial slot 37 and a communicating, offset peripheral slot to receive a detenting protrusion 41 of the closure member 16.

The closure member 16 has an interior chamber 43 which communicates with a side outlet port 45 in the side arm 47. The side arm 47 preferably has a relief port outlet 24 communicating with port 45 and including a valve closure member 49 resiliently biased into a closed position by resilient means such as a helical coil spring 51. The side arm 47 preferably has means such as an annular rim 50 for the detachable mounting of a reversibly mounted check valve 26. The check valve 26 can be of conventional construction and include a resiliently biased valve closure member which deflects from its closed position in a single direction to permit flow in one direction only as indicated by an indicia such as arrow 52 on the external housing of the valve. The opposite ends of the check valve 26 can include quick detachment means such as retainer members 54 which can be axially deflected to permit mounting of the check valve to the free end of arm 47.

The probe 18 bears a plurality of indicia 20 which cooperate with an index mark of the valve closure means to register the amount of liquid which can be dispensed from the container at any particular elevational position of probe 18 within container 14. The index of the valve closure means can, conveniently, be the upper surface of end cap 33. Preferably indicia 20 represent volumetric quantities of liquid such as ounces, cubic centimeters, pints, liters, quarts, etc.

The lower end of the tubular probe member 18 preferably bears a spray head fitting 60 which includes an interior chamber with a plurality of spray apertures 61 and 63 disposed thereabout and mounted or directed to propel liquid along the lines of the arrowhead lines shown in the figure when liquid is forcefully pumped through the tubular probe member 18 into container 14.

The aforementioned assembly can preferably be formed of low cost plastics, e.g., the aperture closure means can be injected molded of a suitable plastic such as a polyolefin, polyethylene or high density polyethylene, polypropylene, etc. or of polyvinylchloride, or an acetyl resin. Enclosure cap 33 can be molded of similar material while the check valve 26 can be of metal or plastics construction. The tubular probe member 18 with its associated valve 28 can likewise be molded of suitable plastics.

Figure 3:
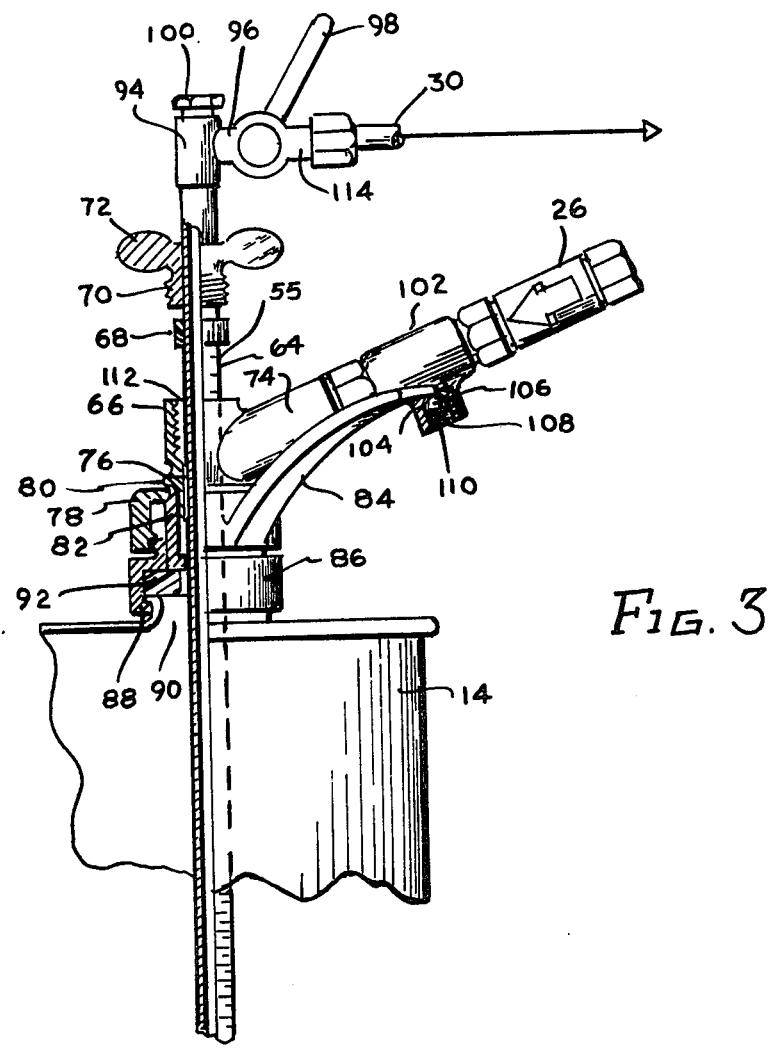
FIG. 3 illustrates another embodiment useful in the system of FIG. 1.

A useful device for employment in the invention is a conventional beer tapper which is presently in surplus quantities, available from the beer industry. This device is shown in FIG. 3 with a suitable adaption for employment in the invention. As there illustrated, the container 14 is fitted with a modified beer tapper device. This beer tapper device includes a tubular probe member 64 which is slidably received within a sleeve 66 having an internally threaded upper end to receive a packing gland 68 and a compression nut 70 which has lever means such as ears 72 for grasping and tightening. The sleeve 66 has a side outlet 74 which is customarily open to the atmosphere when the device is used in its intended purpose for dispensing of beer. The port through side outlet 74 provides communication through an annular zone 76 surrounding tubular probe 64, into the interior of container 14.

Sleeve 66 is received within cap 78 and, to this end, has an annular shoulder 80 which bears agains the upper therethrough. The lower end of sleeve 66 is received in a press fit in sleeve 82, thereby permanently securing the assembly of sleeve 66 and cap 78. Cap 78 has internal threads about its lower end and a handle 84 permitting this assembly to be tightened in engagement on the threaded upper end of the closure member 86 which has a lower end with detents 88 that can removably grasp the wall of the aperture gland 90 of container 14. A suitable gasket 92 is employed in the assembly to provide a sealed engagement with container 14.

The upper end of the tubular probe member 64 has a sleeve 94 threadably engaged thereon. Sleeve 94 has a threaded side outlet which receives a conventional plug valve 96 having a handle 98. The upper end of sleeve 94 receives a plug 100.

The aforedescribed beer tapper is modified in accordance with this invention by mounting on side outlet 74 a check valve means such as check valve 26 previously described with reference to FIG. 2. Preferably, the assembly is also provided with a pressure relief means such as pressure relief valve 102 which has a relief port outlet 104 that has a valve closure member 106 resiliently biased by helical coil spring 108 into a closed registration with relief port 110.

The beer tapper device as thus described is also further modified by the provision of a plurality of regularly spaced indicia 55 which are calibrated to cooperate with the upper edge 112 of sleeve 66 to register volumetric quantities of a liquid.

The discharge end 114 of the plug valve 96 is connected to a suitable conduit such as conduit 30, previously described with reference to FIG. 1, leading to a transfer means such as a pump 32 manifolded in the manner illustrated in FIG. 1.

The invention has been described with reference to the illustrated and presently preferred embodiments thereof. It is not intended that the invention be limited by this disclosure of the presently preferred embodiment. Instead, it is intended that the invention be defined by the means, and their obvious equivalents, set forth in the following claims.

What is claimed is:

1. A device for the positive control of liquid dispensed from a container having an aperture in a wall thereof which comprises:

aperture closure means having a through passageway and mounting means for removable and sealed attachment of said closure means to said container with said through passageway communicating with said aperture;

a liquid dispensing tube slidably received in said through passageway to extend through said aperture into said container;

sealing means to fixedly secure said dispensing tube at any of varied axial spacings in said closure means;

indicia carried by said dispensing tube along the length thereof cooperative with index means on said closure means and calibrated in amounts of liquid corresponding to the depth of said dispensing tube in said container; and container vent means in said closure means and reversible check means cooperative therewith to permit reversing adjustment between venting into and out of said container.

2. The device of claim 1 including valve means carried by said dispensing tube.

3. The device of claim 1 including liquid transfer means having pump means connected to receive the discharge from said dispensing tube and to transfer discharged liquid to a point remote therefrom, including manifold means for reversing the flow through said dispensing tube, to inject liquid into said container.

4. The device of claim 3 wherein the lower end of said dispensing tube received within said container bears spray header means whereby liquid ejected therefrom can be forcefully sprayed against the interior walls of said container.

5. The device of claim 1 wherein said aperture closure means carries pressure relief means to relieve pressure within said container exceeding a predetermined value.

* * * * *